United States Patent [19]
Culpepper et al.

[11] Patent Number: 5,360,099
[45] Date of Patent: Nov. 1, 1994

[54] ADJUSTABLE FLIGHT BAR SYSTEM

[75] Inventors: Will L. Culpepper, Covington; Glenn Robinson, Atlanta, both of Ga.

[73] Assignee: The Mead Corporation, Smyrna, Ga.

[21] Appl. No.: 146,518

[22] Filed: Nov. 2, 1993

[51] Int. Cl.⁵ ............................................. B65G 29/00
[52] U.S. Cl. ................................... 198/473.1; 198/725; 198/731; 198/803.11
[58] Field of Search ........... 198/717, 725, 731, 803.11, 198/473.1

[56] References Cited

U.S. PATENT DOCUMENTS

| | | | |
|---|---|---|---|
| 2,358,292 | 9/1944 | Malhiot | 198/803.11 |
| 3,288,271 | 11/1966 | Burford | 198/803.11 |
| 3,340,996 | 9/1967 | Cerf | 198/803.11 |
| 3,778,959 | 12/1973 | Langen et al. | 53/26 |
| 3,857,474 | 12/1974 | Hutson | 198/803.11 X |
| 4,237,673 | 12/1980 | Calvert et al. | 53/48 |
| 4,893,707 | 1/1990 | Langen et al. | 198/803.11 X |
| 5,065,670 | 11/1991 | Leiweke | 198/731 X |
| 5,072,573 | 12/1991 | Tisma | 198/803.9 X |
| 5,188,217 | 2/1993 | Bruno | 198/473.1 X |
| 5,238,101 | 8/1993 | Ota et al. | 198/803.11 X |
| 5,241,806 | 9/1993 | Ziegler et al. | 53/566 |

Primary Examiner—Cheryl L. Gastineau
Attorney, Agent, or Firm—Kennedy & Kennedy

[57] ABSTRACT

An adjustable flight bar system (10) for advancing articles along a predetermined path includes a pair of conveyor chains (11) and a series of adjustable flight bars (13). Each flight bar has a support member (23) and an auxiliary member (24) coupled to the support member through cross links (25). The auxiliary member is movable between a retracted position adjacent the support member and an extended position away from the support member to accommodate articles of different sizes.

6 Claims, 2 Drawing Sheets

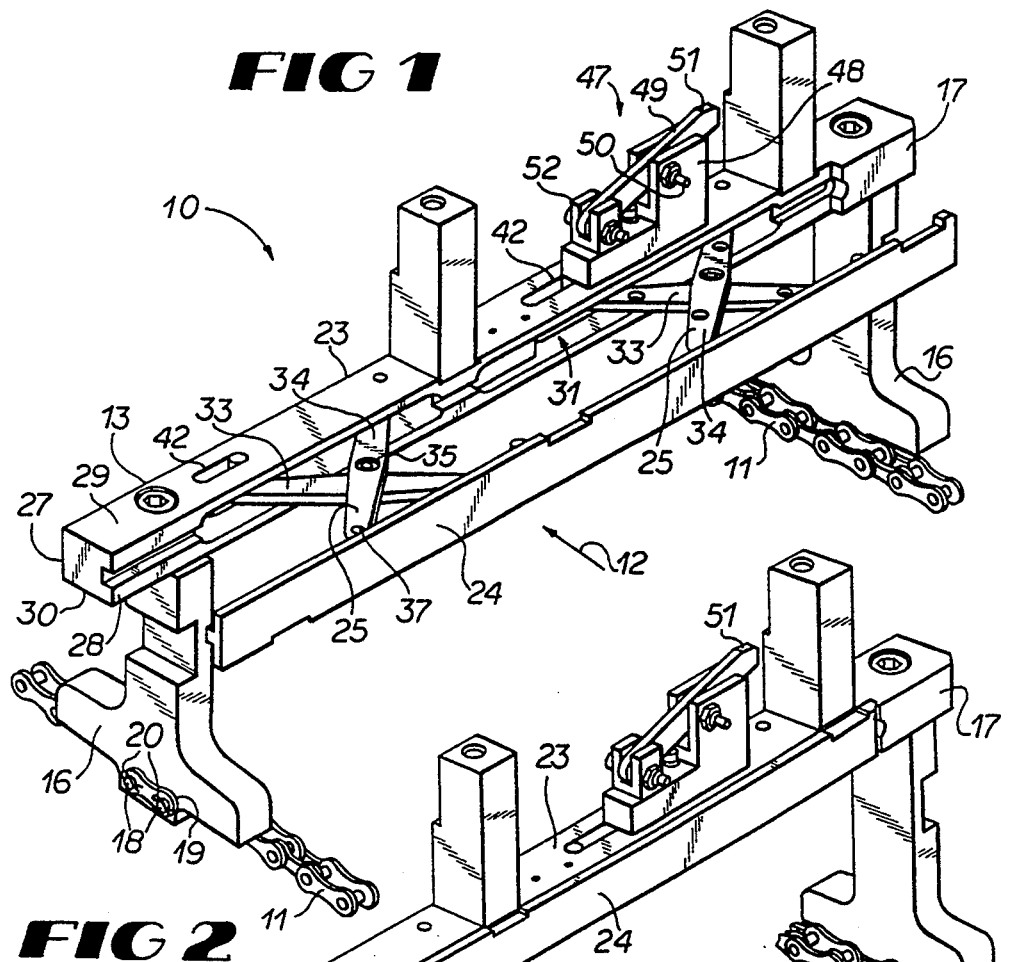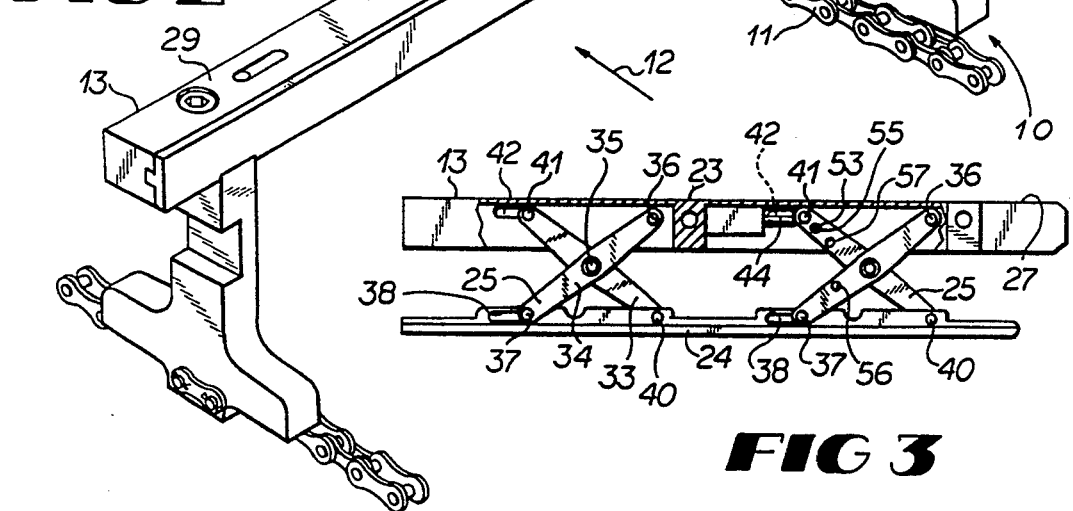

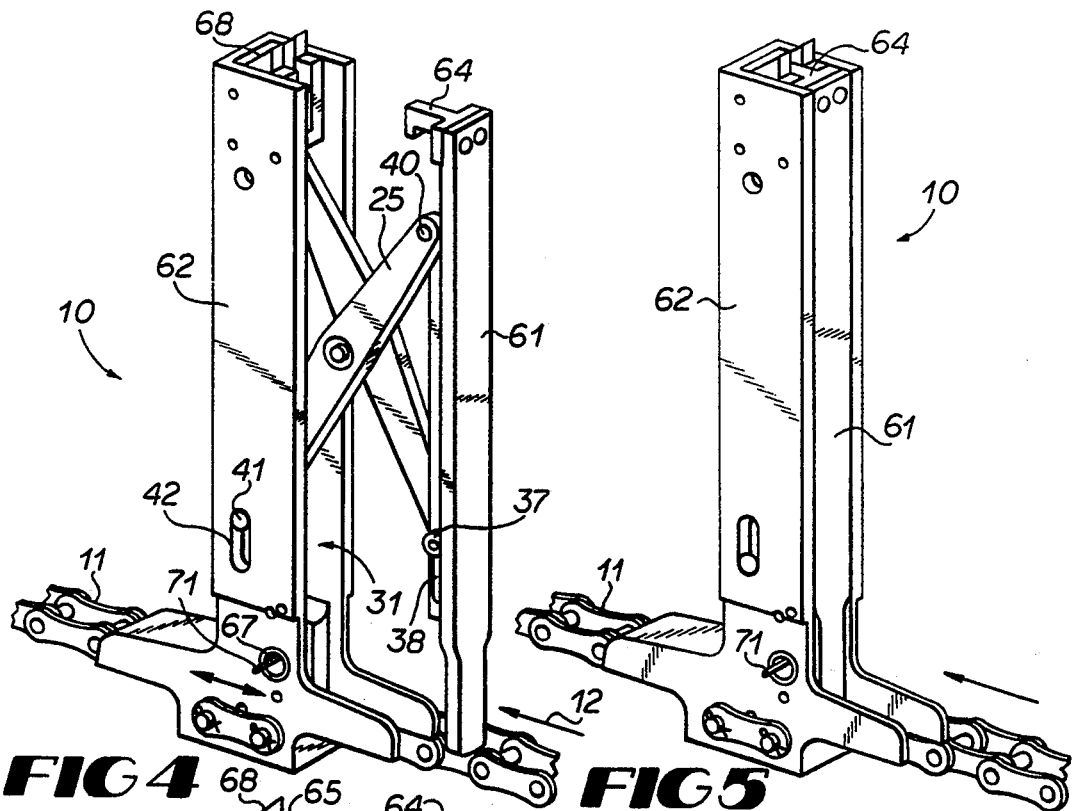
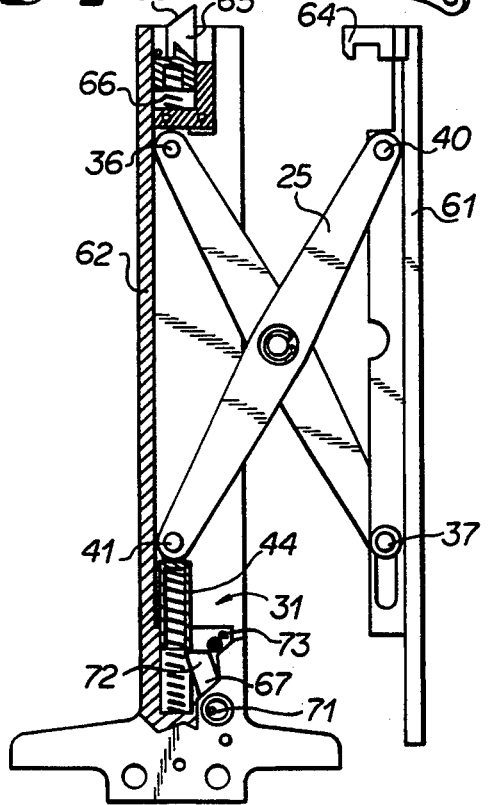

ADJUSTABLE FLIGHT BAR SYSTEM

TECHNICAL FIELD

This invention relates to systems having flight bars for advancing articles along a predetermined path, and particularly to systems having adjustable flight bars which can vary the distance between adjacent flight bars to accommodate articles of different sizes.

BACKGROUND OF THE INVENTION

Today, flight bar systems are used for separating and advancing single articles or groups of articles in sequence along a predetermined path. These systems typically have an endless conveyor chain coupled to a series of flight bars which define an article space therebetween in which the article to be advanced is positioned. These flight bar systems are often used in conjunction with packaging machines for the advancement of both the articles to be packaged and the containers in which they are loaded. Oftentimes, the flight bar systems advance different size groups of articles, different articles or container of different sizes. Therefore, flight bar systems must be adaptable so that the spacing between adjacent flight bars can be varied.

Flight bar systems have been designed having flight bars which can be manually removed from the conveyor chain and remounted in another position along the chain to change the spacing between flight bars. The reconfiguration of the flight bars in this manner requires the number of flight bars to be increased or decreased in order to occupy the entire conveyor chain. Obviously, this method of reconfiguring the flight bar system is laborious and time consuming. Similarly, flight bar systems have also been designed having flight bars which are manually removed and replaced with other flight bars of a different width. However, again this method of reconfiguring the flight bar system is laborious and time consuming.

Flight bar systems have also been designed having flight bars to which spacer strips are manually mounted to increase the overall width of the flight bars in order to decrease the spacing between adjacent flight bars. However, once again this method is labor intensive and time consuming.

It thus is seen that a need remains for a flight bar system which can vary the spacing between adjacent flight bars in a more efficient manner. Accordingly, it is to the provision of such an improved system that the present invention is primarily directed.

SUMMARY OF THE INVENTION

In preferred form of the invention, a system for advancing articles in sequence along a predetermined path comprises an endless conveyor chain and a plurality of flight bars coupled to the conveyor chain to define article receiving spaces between adjacent flight bars. Each flight bar has a support member mounted to the conveyor chain, an auxiliary member coupled to the conveyor chain, and means for positioning the auxiliary member in at least two different positions relative to the support member for adjusting the size of the article receiving spaces therebetween.

BRIEF DESCRIPTION OF THE DRAWING

FIG. 1 is a perspective view of a portion of a flight bar system embodying principles of the invention in a preferred form, shown with a flight bar in an extended configuration.

FIG. 2 is a perspective view of the portion of the flight bar system of FIG. 1 shown with a flight bar in a retracted configuration.

FIG. 3 is a top view of a flight bar of the portion of the flight bar system of FIG. 1 with the top wall removed for clarity.

FIG. 4 is a perspective view of a portion of a flight bar system of an alternative embodiment, shown with a flight bar in an extended configuration.

FIG. 5 is a perspective view of the portion of the flight bar system of FIG. 4 shown with a flight bar in a retracted configuration.

FIG. 6 is a side view of a flight bar of the portion of the flight bar system of FIG. 4 with a portion of the side wall removed for clarity.

DETAILED DESCRIPTION

With reference next to the drawing, there is shown in FIG. 1 a portion of a flight bar system 10 having a pair of substantially parallel, endless, conveyor chains 11 which provide an article path of travel indicated generally by arrow 12 and one flight bar 13 in a series thereof at equally spaced intervals. System 10 is similar in basic construction to that shown in detail in U.S. Pat. No. 3,778,959 which is also owned by the assignee of the present invention.

Each flight bar 13 has two support posts 16 and an elongated support bar 17 mounted to the top of the support posts 16 so as to traverse the article path 12. The support posts 16 have two mounting holes therethrough through which two shanks 18 of the conveyor chain 11 extend and are fixed thereto by link plate 19 and cotter pins 20 so as to mount each support post 17 to a conveyor chain 11.

The support bar 17 has a support member 23 and an auxiliary member 24 coupled to the support member 23 through a pair of cross links 25. The support member 23 has a front surface 27, a rear surface 28, a top wall 29, a bottom wall 30 and an elongated channel 31 between the top and bottom walls 29 and 30. The cross links 25 have a lower member 33 and an upper member 34 pivotably mounted to the lower member 33 about a pivot pin 35. Each upper member 34 is pivotably mounted at one end to the support member 23 through a pivot pin 36 and slidably mounted at its opposite end to the auxiliary member 24 through a pivot pin 37 extending through an elongated slot 38 in the auxiliary member 24. Each lower member 33 is pivotably mounted at one end to the auxiliary member 24 through a pivot pin 40, and slidably mounted at its opposite end to the support member 23 through a pivot pin 41 extending through elongated slots 42 in the support member top and bottom walls 29 and 30. A spring biased push rod 44 is mounted within the support member channel 31 in abutment with the slidable end of the cross link lower member 33.

A locking device 47 is mounted to the top wall 29 of the support member 23. The locking device 47 has a support block 48 and a spring biased actuation arm 49 pivotably mounted to the support block 48 through a pivot pin 50. The actuation arm 49 has an upper end having a cam follower surface 51 adapted to ride upon an unshown cam and a lower end pivotably mounted to a collar portion 52 of a locking pin 53. Locking pin 53 extends through the support member top wall 29 and into channel 31. With the auxiliary member 24 in an extended position away from the support member 23, as shown in FIGS. 1 and 3, the locking pin 53 extends through a locking hole 55 in the lower member 33 of the right most cross link 25 to prevent movement of the cross link so as to lock the auxiliary member in its extended position. With the auxiliary member 24 in a retracted position, as shown in FIG. 2, the locking pin 53 extends through a locking hole 56 in upper member 34 and a locking hole 57 in the lower member 33 which is aligned with locking hole 56 to lock the auxiliary member in its retracted position.

In use, articles, such as a single carton or a group of cans, are separated by the flight bars 13 and advanced along the predetermined path of travel 12. The articles are positioned so as to nest between adjacent flight bars with the leading surface of each article being adjacent the auxiliary member 24 of the forward flight bar, with respect to the direction of travel, and the article trailing surface adjacent the front surface 27 of the trailing flight bar. With the flight bars 13 in their retracted position the distance or space between adjacent flight bars is at a maximum, i.e. the article receiving space is maximized. Alternatively, with the flight bars in their extended position the space between adjacent flight bars is minimized.

In order to reconfigure each flight bar 13 to its extended position, as shown in FIGS. 1 and 3, the conveyor chain 11 simply moves the flight bar past an unshown cam which is sized and shaped to engage the actuation arm cam follower surface 51. The cam forces the upper end of arm 49 downward against the spring biasing force of an unshown spring mounted within support block 48 causing its lower end to rotate upwards about pivot pin 50. The upward movement of the arm's lower end withdraws the locking pin 53 coupled thereto from locking holes 56 and 57. The withdrawal of locking pins from the locking holes releases the cross links 25 for movement. The biasing force of push rod 44 then causes the ends of the cross links mounted to the support member 23 to move towards each other, thereby forcing the auxiliary member 24 away from the support member 23 and into its extended position. Once the auxiliary member is fully extended the cam releases the actuation arm 49 and the locking pin 53 is spring biased downward into locking hole 55, as shown in FIG. 4. With the locking pin 53 positioned within locking hole 55, the cross links are once again prevented from moving thus locking the auxiliary member in its extended position.

The flight bar is reconfigured from its extended position to its retracted position by simply engaging the locking device 47, as previously described, in order to withdraw the locking pin 53 from locking hole 55 and by forcing the auxiliary member 24 toward the support member 23. This is a reversal of the process just described in reference to the auxiliary member being moved from its retracted position to its extended position. The auxiliary member 24 may be forced toward the support member by separate mechanical means which exerts a force upon the auxiliary member or by spring means mounted to the support member which are adapted to cooperate with push rod 44.

With reference next to FIG. 4, an adjustable flight bar 60 of alternative construction is shown. Flight bar 60 here is adapted to be mounted to each conveyor chain 11 so as to extend normally to the article path of travel indicated generally by arrow 12. The basic construction of flight bar 60 is similar to the previously described flight bar 13 except for the construction of the locking device for locking the positions of the auxiliary member 61 relative to support member 62. Here, the locking device has a U-shaped catch 64 mounted along the top edge of the auxiliary member 61, a movable catch plate 65 which is sized and shaped to engage catch 64 and biased upwards by a spring 66, and a release trigger 67 mounted within the support member channel 31. The catch plate 65 has a cam follower surface 68 extending beyond the support member. The release trigger 67 has an engagement rod 70 extending from the both side of the auxiliary member, and a pivotable latch 72 biased toward push rod 44 by a spring 73. Latch 72 is mounted for movement between a position engaging the spring biased push rod 44 to prevent its downward movement as shown in FIG. 6, and a position disengaged from push rod 44.

In order to reconfigure each flight bar 60 to its extended position shown in FIGS. 4 and 6, the conveyor chain 11 simply moves the flight bar 60 past an unshown cam which is sized and shaped to engage the catch plate cam follower surface 68. The cam forces the catch plate 65 downward against the spring biasing force of spring 66, thereby causing the catch plate to be released from catch 64. Once the catch releases the catch plate the biasing force of push rod 44 causes the ends of the cross links mounted to the support member to move towards each other, thereby forcing the auxiliary member 24 away from the support member 23 and to its extended position. The full extension of the auxiliary member allows latch 72 to be spring biased to a position beneath push rod 44, as shown in FIG. 6, thus locking the auxiliary member in its extended position.

The flight bar 60 is reconfigured from its extended position to its retracted position by simply engaging the engagement rod 71 so as to move latch from beneath push rod 44 and forcing the auxiliary member 61 toward the support member 62 so that catch 64 engages catch plate 65. The repositioning of latch 72 allows the push rod 44 to be forced downward. This is a reversal of the process just described in reference to the auxiliary member being moved from its retracted position to its extended position. The auxiliary member 61 may be forced toward the support member by separate mechanical means which exerts a force upon the auxiliary member or by spring means mounted to the support member which is adapted to cooperate with the force exerted by push rod 44.

It should be understood that the flight bars may also be designed to have more than one extended position, i.e. the auxiliary members may be extended to different distances from the support member to allow for different sized articles. Also, to accommodate very small size articles, auxiliary members may be mounted to each side of a support member, where the number of flight bars per conveyor chain is fixed.

It should also be understood that within this application the component of the first embodiment, as shown in FIGS. 1–3, and the components of the second embodiment, as shown in FIGS. 4–6, which are referred to in common terms are to be considered equivalents.

From the foregoing it is seen that an adjustable flight bar system is now provided which overcomes problems long associated with those of the prior art. It should however be understood that the just described embodiments merely illustrate principles of the invention in its preferred forms. Many modifications, additions and deletions may be made without departure from the spirit and scope of the invention as set forth in the following claims.

We claim:

1. The system for advancing articles in sequence along a predetermined path comprising an endless conveyor chain and a plurality of flight bars coupled to said conveyor chain defining article receiving spaces between adjacent flight bars, and wherein each of said flight bars has a support member mounted to said conveyor chain, an auxiliary member coupled to said conveyor chain, means for positioning said auxiliary member in at least two different positions relative to said support member for adjusting the size of the article receiving spaces therebetween, and wherein said positioning means includes at least one pair of cross links pivotably mounted together with one end of each link pivotably mounted to said support member and the opposite end of each link pivotably mounted to said auxiliary member.

2. The system of claim 1 comprising spring means biasing said auxiliary member away from said support member.

3. The system of claim 2 further comprising locking means for locking said auxiliary member in each of said two different positions.

4. A system for advancing articles in sequence along a predetermined path comprising an endless conveyor chain and a series of flight bars coupled to said conveyor chain, and wherein each of said flight bars has a support member mounted to said conveyor chain, an auxiliary member supported upon said support member, and positioning means having at least one spring biased link mounted to said support member and said auxiliary member for spring biased movement of said auxiliary member from a first position to a second position with respect to said support member, whereby the auxiliary members may be moved between their first and second positions to change the distance between adjacent flight bars in advancing articles of different sizes.

5. The system of claim 4 wherein said positioning means includes at least one pair of cross links pivotably mounted together with one end of each link pivotably mounted to said support member and the opposite end of each link pivotably mounted to said auxiliary member.

6. The system of claim 4 further comprising locking means for locking said auxiliary member in each of said two different positions.

* * * * *